United States Patent [19]

Burger et al.

[11] Patent Number: 5,388,153
[45] Date of Patent: Feb. 7, 1995

[54] APPARATUS AND METHOD FOR DETECTING TELEPHONE LINE STATUS

[75] Inventors: Theodore O. Burger, Fairland; John A. Karpicke, Indianapolis; Donald M. Keen, Indianapolis; Donald R. Means, Indianapolis; Thomas A. Stahl, Indianapolis; Brian A. Wittman, Indianapolis, all of Ind.

[73] Assignee: AT&T Corp., Murray Hill, N.J.

[21] Appl. No.: 38,752

[22] Filed: Mar. 26, 1993

[51] Int. Cl.$^6$ ............................................ H04M 1/00
[52] U.S. Cl. ............................ 379/164; 379/156; 379/165; 379/166
[58] Field of Search ............... 379/156, 161, 162, 163, 379/164, 165, 166, 377, 382

[56] References Cited

U.S. PATENT DOCUMENTS

| | | | |
|---|---|---|---|
| 4,446,338 | 5/1984 | Rosch | 179/18 |
| 4,451,707 | 5/1984 | Hanscom | 179/84 |
| 4,628,153 | 12/1986 | Daly | 379/164 |
| 4,631,367 | 12/1986 | Coviello et al. | 379/164 |
| 4,677,661 | 6/1987 | van Gilluwe et al. | 379/159 |
| 4,677,662 | 6/1987 | Lott | 379/162 |
| 4,734,933 | 3/1988 | Barsellotti et al. | 376/164 |
| 4,742,536 | 5/1988 | Dewenter et al. | 379/382 |
| 4,742,538 | 5/1988 | Szlain | 379/387 |
| 4,802,207 | 1/1989 | Uchida | 379/164 |
| 4,803,718 | 2/1989 | Neil et al. | 379/163 |
| 4,817,132 | 3/1989 | Chamberlin | 379/165 |
| 4,897,871 | 1/1990 | Minch et al. | 379/382 |
| 4,995,111 | 2/1991 | Tojo et al. | 379/382 |

Primary Examiner—James L. Dwyer
Assistant Examiner—Vijay Shankar
Attorney, Agent, or Firm—Michael A. Morra

[57] ABSTRACT

Telephone line status indication is improved by making measurements of the differential voltage across the Tip-Ring terminals of a telephone set. The telephone set is connected to a telephone line which is shared with other parallel-connected sets. The measurement of differential line voltage is made time the set changes state (i.e., between on-hook and off-hook). The maximum magnitude of one of the last three measurements is stored to represent the state, and is arithmetically averaged with the maximum magnitude of one or the last three stored for the oil-hook state to create a reference voltage. The reference voltage is updated each time the telephone set changes state and is continually compared with the present differential line voltage to determine which one is larger A light-emitting-diode on the telephone set indicates that the telephone line is in use whenever the reference voltage exceeds the measured differential line voltage.

17 Claims, 3 Drawing Sheets

APPARATUS AND METHOD FOR DETECTING TELEPHONE LINE STATUS

TECHNICAL FIELD

This invention relates to a method and apparatus for determining when a telephone line is in use, and more particularly to a technique that accurately determines line status in the face of varying line conditions.

BACKGROUND OF THE INVENTION

The cost of telephone sets has decreased to such a degree that many, perhaps most, homes are now equipped with several of them. New homes are pre-wired for telephones in every room, and older homes are being re-wired to strategically add telephones at various locations. All of this effort is aimed at improving convenience so that telephones can be within easy reach—no matter where individuals are located within the home, whether in the basement or the bedroom. The proliferation of telephones within the home has been encouraged by the fact that they can all share the same wire-pair. This has led to problems when more than one person wants to use the telephone at the same time. In particular, it is annoying for a person already engaged in a telephone conversation to endure the loud sounds that occur when another person begins dialing. Furthermore, there still exist sensitive persons who feel badly when they disturb others. These concerns have been addressed by telephone sets that visually display the status of the telephone line. Typically, a light emitting diode associated with a telephone set is turned ON whenever another telephone set, that shares the same line, is in an off-hook (active) state. However, detecting the off-hook state is not as easy as one might suspect.

Telephone Office equipment furnishes DC power to each telephone set over the telephone line that interconnects them. When the telephone is in an on-hook (idle) state, there is practically no DC current flow over the telephone line. When the telephone set is in the off-hook state, there is a limited amount of DC current flow which is used to power the telephone set and is detected by the Telephone Office to activate equipment to serve the telephone set. U.S. Pat. No. 4,451,707 discloses a known design for a line status circuit which uses a fixed reference voltage to determine whether the telephone set is in its on-hook or off-hook state. However, the amount of DC current flow over the telephone line is highly variable because, for example, the length of the telephone line varies considerably, so the voltage across the line is not the same among telephones in the off-hook state.

Determining the appropriate on-hook/off-hook reference voltage is further complicated by the existence of low-voltage SLC (Subscriber Loop Carrier) lines which can have an on-hook voltage of 12 volts. This is less than the oft-hook voltage of some telephones on very short telephone lines. Solutions to this problem have taken one of two approaches: (1) ignore the low-voltage SLC case since their percentage is small, or (2) provide a customer-selectable reference voltage using a switch and a simple installation procedure. In case (1), telephones connected to SLC lines will always indicate that the telephone line is in use, thus rendering the feature useless; and in case (2), there is the added cost of the switch as well as an inconvenience to the customer who must now perform another installation procedure which might not be performed correctly.

Additionally, it is known to sense line voltage transients to determine when another telephone set on the same telephone line goes off-hook. Such techniques, however, rely on voltage changes and can be "fooled" by inadvertent noise as well as the operation of a pulse dialer. Accordingly, it is desirable to determine the status of a telephone line reliably—regardless of its length or noise condition.

SUMMARY OF THE INVENTION

A telephone station includes a switch for connecting it to a telephone line, the switch causing the wire-pair to be in a first state when it is closed and causing it to be in a second state when it is open. The telephone station also includes apparatus for measuring the differential voltage, $V_{LINE}$, across the wire-pair. When the switch is closed, a first value of $V_{LINE}$ is measured and stored. When the switch is opened, a second value of $V_{LINE}$ is measured and stored. The first and second stored values are used in calculating a reference voltage $V_{REF}$ that resides between them which is compared with $V_{LINE}$ to determine which one is larger. The results of this comparison are displayed on the telephone station.

In an illustrative embodiment of the invention only three values of differential line voltage are stored for each state (on-hook, off-hook). The maximum of the three differential voltage values associated with the on-hook state is arithmetically averaged with the maximum of the three differential voltage values associated with the off-hook state to create the reference voltage.

In the illustrative embodiment, a single telephone line is shared by a number of parallel-connected telephone sets. It is an advantage that the maximum value of the differential voltage measurement is used because measurements are sometimes made when another telephone set is off-hook, and this leads to erroneously low values. Finally, because the reference voltage is updated each time the telephone set changes state, it readily adapts to any set of differential voltages on the telephone line; thereby rendering it both useful and accurate for all telephone lines, even low-voltage Subscriber Loop Carrier lines.

BRIEF DESCRIPTION OF THE DRAWING

The invention and its mode of operation will be more clearly understood from the following detailed description when read with the appended drawing in which.

DETAILED DESCRIPTION

Figure 1:
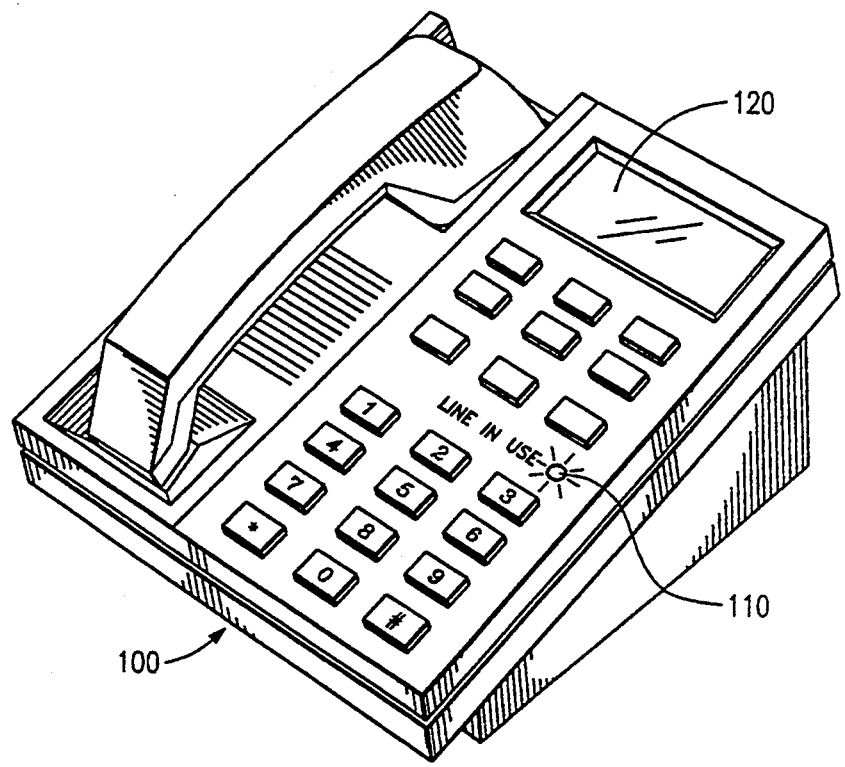
FIG. 1 discloses a telephone set equipped with displays for indicating line status.

FIG. 1 shows a high-feature telephone set 100 that includes a liquid crystal display (LCD 120) which provides a good deal of information to users such as time-of-day, dialed telephone numbers, or even the telephone number of an incoming call. A telephone line (not shown) connects telephone set 100, along with any other telephone sets that share the line, to a Telephone Office. The present invention is concerned with detecting when those other telephone sets are off-hook and displaying such information on telephone set 100. Accordingly, LCD 120 may be used for this purpose along with the display of the other information discussed above. Because LCDs generally rely on reflected light, they do not command the attention of users and are, therefore, not widely used for displaying line status. Instead, a light emitting diode such as LED 110 is used to alert a user that the telephone line is in use. Generally, LED 110 is turned ON when the line is in use, and turned OFF when the line is available.

Figure 2:
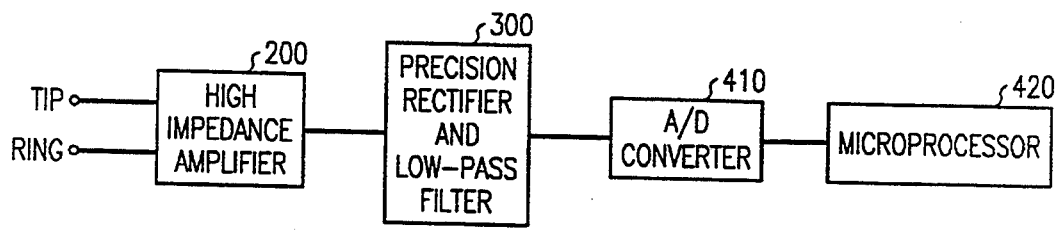
FIG. 2 discloses a high-level block diagram of circuitry for detecting line status in accordance with the invention.

A high-level block diagram is shown in FIG. 2, which generally illustrates the major functional components used in implementing the present invention. A high impedance amplifier 200 is used to bridge (a parallel electrical connection) the line status detecting circuit onto the Tip-Ring leads of the telephone line. A high impedance connection is used to minimize current drain during the on-hook state in order to meet regulatory requirements. It is noted that the telephone line itself may include leakage paths to ground along the route from the Telephone Office, which also contributes to the current drain. The output of the high impedance amplifier includes a DC voltage that is representative of the voltage difference between the Tip-Ring input terminals. A precision rectifier and low-pass filter 300 assures that the DC voltage has the same polarity when the Tip-Ring connection is reversed, and that noise transients and speech signals are removed from the resulting DC voltage.

At this point, the DC voltage is converted into a digital signal by analog-to-digital (A/D) converter 410 for use in microprocessor 420. The present invention takes advantage of the fact that a microprocessor is present and is seldom used to its full capacity when the telephone set is in the on-hook state. Even the simplest telephone sets now use microprocessors because of their ability to perform so many different tasks and their low cost.

Figure 3:
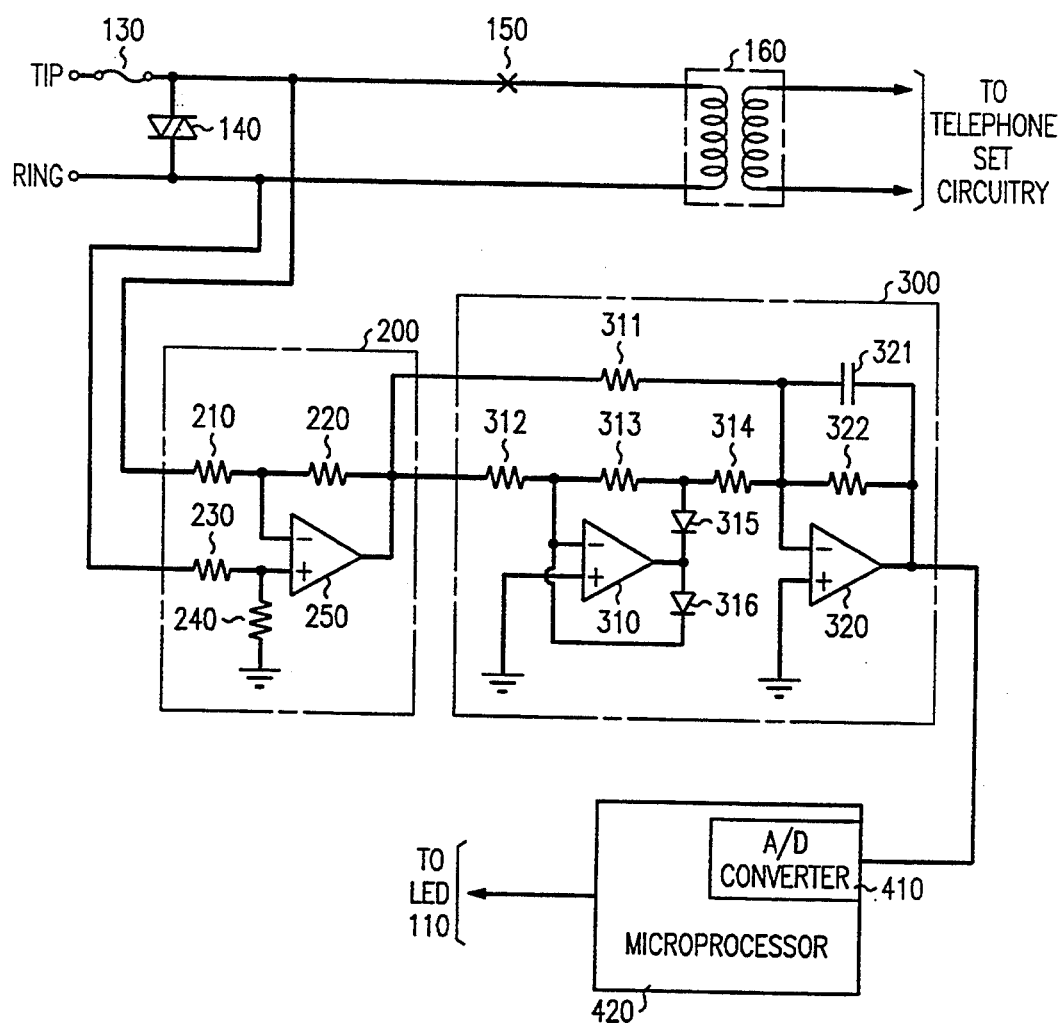
FIG. 3 is a detailed schematic drawing of the line status detector of the present invention.

A detailed schematic of the block diagram of FIG. 2 is disclosed in FIG. 3, which shows the line status circuit parallel-connected to the input circuitry of the telephone set. The input circuitry is shown because it is representative of the circuitry within the other telephone sets that connect to the same Tip-Ring terminals. Fuse 130 limits the maximum current that can be drawn by the telephone set in order to protect against excessive heating during a fault condition. Metal Oxide Varistor 140 protects the telephone set against overvoltage and lightning conditions, and transformer 160 provides DC isolation between the telephone line and circuitry within the telephone set. Of particular interest is line switch 150 which may be a metallic contact or a semiconductor device. In either event, the cumulative DC resistance of the input circuitry presented to the Tip-Ring terminals is typically 150-200 ohms when the line switch 150 is closed (off-hook state). In the present invention, line switch 150 is a solid state device which is commercially available from AT&T as Part Number LH-1056AT. It has a typical DC resistance of 30 ohms, and the typical DC resistance of the transformer 160 is 120 ohms. Other telephone sets that share the telephone line are assumed to have similar DC characteristics.

Amplifier 200 is parallel connected to Tip-Ring terminals and includes input resistors 210, 230 which are 22M-ohms each to assure high input impedance. Bias resistor 240 and feedback resistor 220 are selected to be 1M-ohm each. Differential amplifier 250 cooperates with resistors to provide a gain of approximately −0.05. For example, if the Tip-to-Ring voltage is −30 volts, then the output voltage of differential amplifier 250 is +1.36 volts; and if the Tip-to-Ring voltage is +30 volts, then the output voltage of differential amplifier 250 is −1.36 volts. Because this voltage can be positive or negative (when the Tip-Ring terminals are reversed) a precision rectifier is used to provide a single polarity output signal. Diodes 315, 316 are connected to provide feedback in differential amplifier 310 so that when the input voltage to amplifier 310 is positive, the amplifier provides a gain of −1.0 because resistors 312 and 313 are equal; but when the input voltage to amplifier 310 is negative, the voltage at the junction of resistors 313, 314 remains at zero volts (due to the significant feedback through diode 316 from the output of amplifier 310 to its input). Accordingly, amplifier 310 operates as an inverting half-wave rectifier when the input voltage is positive. The extension to a full-wave rectifier is effected by amplifier 320 whose input is delivered via resistor 311 when the input voltage is negative. Amplifier 320 is extended by the addition of capacitor 321 to become a first order low-pass filter. Further detail regarding the construction of precision rectifier and low-pass filter 300 can be found in *Advanced Electronic Circuits* by U. Tietze and C. Schenk, pp. 449–452, © 1978 Springer-Verlag Berlin Heidelberg. An illustrative example of a commercially available operational amplifier which is suitable for use in the present invention is Part No. TLC27M4BCD from Texas Instruments.

Figure 4:
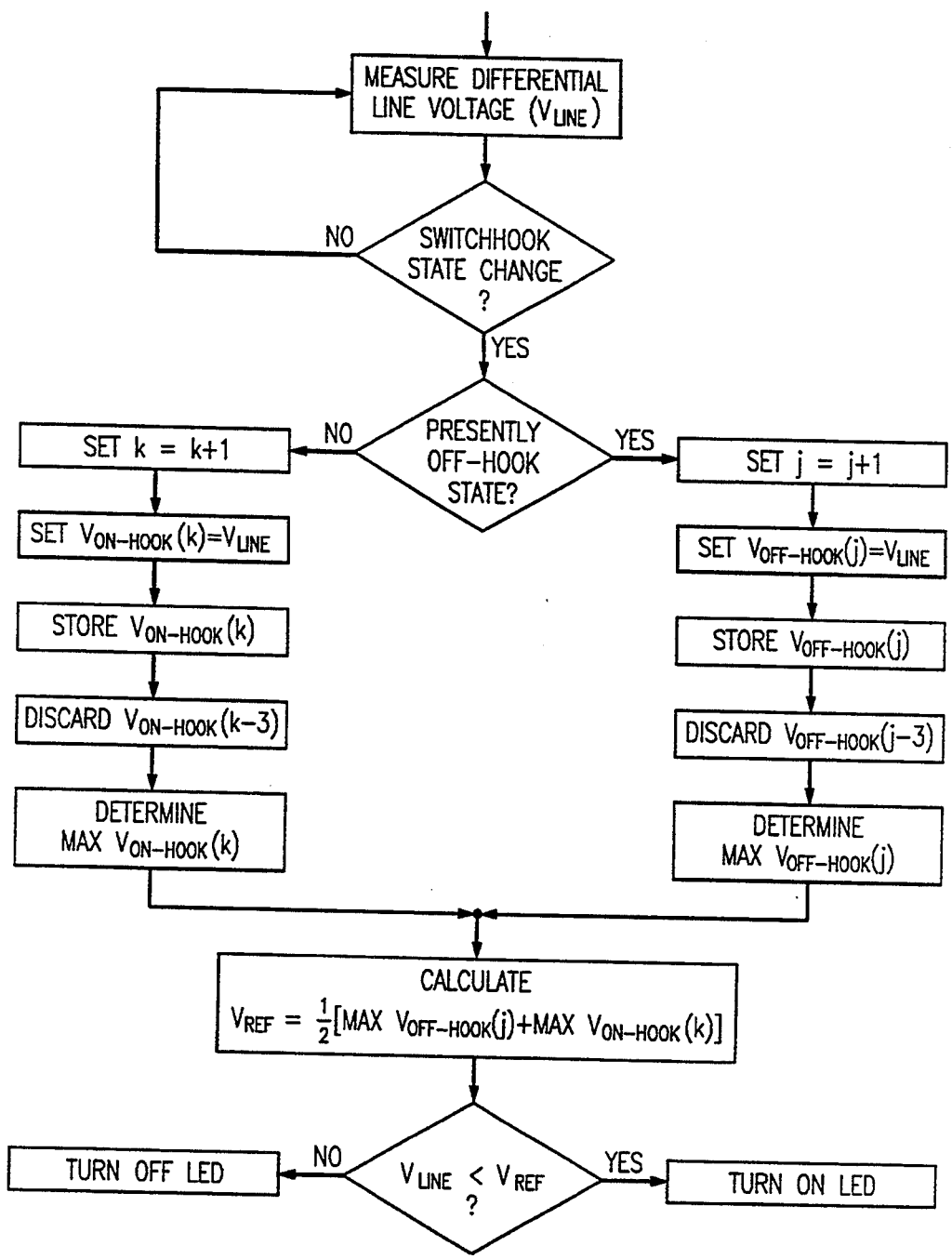
FIG. 4 shows a flow diagram used in implementing the invention.

Having rectified and filtered the differential voltage across the Tip-Ring terminals of the telephone line, the resulting signal is then converted into a binary digital number by A/D converter 410, and processed in microprocessor 420 according to steps in the flow diagram of FIG. 4. A suitable microprocessor which has built-in A/D conversion is Part No. M37700—a 16-bit microprocessor which is commercially available from Mitsubishi.

Referring now to FIG. 4, the invention will be described with greater particularity. Briefly, however, the present invention discloses a telephone set that "learns" the meaning of different voltage differentials across the telephone line $V_{LINE}$ and then decides whether the voltage differential represents a line-in-use condition. This is accomplished by measurements taken each time the telephone set goes on-hook or off-hook. The measurements are averaged to create a reference voltage $V_{REF}$ which is continuously compared with $V_{LINE}$ to determine whether any telephone set is using the telephone line. This procedure assumes that all telephone sets have approximately the same DC input resistance and, thus, create the same differential line voltage when they are in the off-hook state.

The differential line voltage $V_{LINE}$ is continuously monitored and compared with the reference voltage $V_{REF}$. When $V_{REF} > V_{LINE}$, then LED 110 (see FIG. 1) is turned on, otherwise it is turned off. FIG. 4 illustratively shows how $V_{REF}$ is determined. The process begins when the switchhook changes state and is substantially the same regardless of whether it changes to the on-hook state or to the off-hook state. In the situation wherein the switchhook changes to the off-hook state a first counter is advanced, and this is denoted by the operation set $j=j+1$. The differential line voltage $V_{LINE}$ is then stored as $V_{OFF-HOOK}(j)$. Since only the most recent values are stored (3 in the illustrative embodiment), $V_{OFF-HOOK}(j-3)$ is discarded. The maximum value of the 3 most recent measurements is designated MAX $V_{OFF-HOOK}$ and is used in calculating $V_{REF}$.

In the situation wherein the switchhook changes to the on-hook state a second counter is advanced, and this is denoted by the operation set k=k+1. The differential line voltage $V_{LINE}$ is then stored as $V_{ON-HOOK}(k)$. Since only the most recent values are stored (3 in the illustrative embodiment), $V_{ON-HOOK}(k-3)$ is discarded. The maximum value of the 3 most recent measurements is designated MAX $V_{ON-HOOK}$ and is used in calculating $V_{REF}$.

$V_{REF}$ is then calculated as the arithmetic average of MAX $V_{OFF-HOOK}$ and MAX $V_{ON-HOOK}$, and used to determine whether another telephone set on that same telephone line is using it. It is noted that $V_{REF}$ is re-calculated each time the telephone set changes switchhook state. Precision rectifier 300 (see FIG. 3) assures that all voltage quantities will be of the same polarity (positive) so that the invention will still function properly if a Tip-Ring reversal occurs. The following discussion relates to the reason for using maximum values in calculating $V_{REF}$.

Consider the situation whereby two telephone sets are off-hook at the same time (e.g., two persons at the same residence are using different telephones to talk to grandma), and the one which uses the invention is returned to its on-hook state. The measured differential line voltage, $V_{LINE}$, will be improperly low because the other telephone set is sail off-hook. If repeated, this situation will lead to improperly low values for $V_{ON-HOOK}(k)$ and, possibly, to an improperly low value for $V_{REF}$. Since MAX $V_{ON-HOOK}(k)$ is used rather than MIN $V_{ON-HOOK}(k)$, it would take 3 consecutive repetitions of this situation to cause an error in $V_{REF}$. Accordingly, it is advantageous to use the maximum value of $V_{ON-HOOK}(k)$ in calculating $V_{REF}$. Similarly, consider the situation whereby one telephone set is already off-hook and the one which uses the invention goes off-hook (e.g., one family member is asked to pick up the telephone to talk to grandma). The measured differential line voltage, $V_{LINE}$, will be improperly low because the other telephone set is off-hook. If repeated, this situation will lead to improperly low values for $V_{OFF-HOOK}(j)$ and, possibly, to an improperly low value for $V_{REF}$. Since MAX $V_{OFF-HOOK}(j)$ is used rather than MIN $V_{OFF-HOOK}(j)$, it would take 3 consecutive repetitions of this situation to cause an error in $V_{REF}$. Accordingly, it is advantageous to use the maximum value of $V_{OFF-HOOK}(j)$ in calculating $V_{REF}$.

Although a particular embodiment has been shown and described, it is understood that various modifications may be made within the spirit and scope of the invention. These modifications include, but are not limited to, the use of more (or less) than three measurements in determining MAX $V_{ON-HOOK}$ and/or MAX $V_{OFF-HOOK}$; the use of other than maximum values of these voltages; the calculation of a value for $V_{REF}$ using non-linear, or geometric, or differently weighted combinations of $V_{ON-HOOK}$ and $V_{OFF-HOOK}$ voltages; and the use of audible, rather than visual, line status indicators. It is noted that all transitions between off-hook and on-hook states need not be accompanied by a recalculation of $V_{REF}$. For example, when the invention is used in a telephone answering machine, a feature known as "remote hold release" causes the answering machine to hang up when another telephone set goes off-hook. In this situation, the differential line voltage is not appropriate to use for updating $V_{REF}$.

We claim:

1. A telephone station including a switch for connecting said telephone station to a wire-pair used for communication, the switch functioning to cause the wire-pair to be in a first state when the switch is closed and in a second state when the switch is open, the telephone station further including apparatus for detecting the state of a wire-pair, said apparatus comprising:

means for measuring differential voltage magnitude, $V_{LINE}$, across the wire-pair;

means for storing a first magnitude of $V_{LINE}$, when the switch changes from being open to being closed;

means for measuring differential voltage magnitude, $V_{LINE}$, across the wire-pair; open to being closed;

means for storing a second magnitude of $V_{LINE}$ when the switch changes from being closed to being open;

means for averaging the first and second stored magnitudes to form a reference voltage $V_{REF}$, said reference voltage being exclusively based on measurements of the first and second differential voltage magnitudes across the wire pair, but not upon any other stored parameter that relates to the impedance condition of the wire pair;

means for comparing the magnitudes of $V_{REF}$ and $V_{LINE}$ to determine which one is larger; and means for indicating the results of said comparison.

2. The telephone station of claim 1 wherein said first and second stored magnitudes are arithmetically averaged to form the reference voltage.

3. The telephone station of claim 1 wherein a number of first magnitudes and a number of second magnitudes are stored, said reference voltage being determined by averaging a selected one of the first magnitudes with a selected one of the second magnitudes.

4. The telephone station of claim 3 wherein the selected one of the first magnitudes is the largest one.

5. The telephone station of claim 3 wherein the selected one of the second magnitudes is the largest one.

6. The telephone station of claim 3 wherein the number of stored first magnitudes is three, and the number of stored second magnitudes is three.

7. The telephone station of claim 1 wherein the indicating means comprises a light-emitting-diode.

8. The telephone station of claim 1 wherein the wire-pair used for communication comprises a telephone line.

9. A system comprising a plurality of telephone sets that are parallel-connected to a common telephone line, said telephone sets each having an ACTIVE state and an IDLE state, said ACTIVE state causing a lower differential voltage to be present on the telephone line than the IDLE state; at least one telephone set including apparatus for detecting whether another telephone set is in said ACTIVE state comprising:

means for measuring the differential voltage, $V_{LINE}$, on the telephone line;

means for storing a first magnitude of $V_{LINE}$ when the state of said one telephone set changes from the ACTIVE to the IDLE state;

means for storing a second magnitude of $V_{LINE}$ when the state of said one telephone set changes from the IDLE to the ACTIVE state;

means for averaging the first and second stored magnitudes to from a reference voltage $V_{REF}$, said reference voltage being exclusively based on measurements of the first and second differential voltage magnitudes across the wire pair, but not upon any other stored parameter that relates to the impedance condition of the wire pair;

means for comparing the magnitudes of $V_{REF}$ and $V_{LINE}$ to determine which one is larger; and means for indicating the results of said comparison.

10. The telephone station of claim 9 wherein said first and second stored magnitudes are arithmetically averaged to form the reference voltage.

11. The telephone station of claim 9 wherein a number of first magnitudes and a number of second magnitudes are stored, said reference voltage being determined by averaging a selected one of the first magnitudes with a selected one of the second magnitudes.

12. The telephone station of claim 11 wherein the selected one of the first magnitudes is the largest one.

13. The telephone station of claim 11 wherein the selected one of the second magnitudes is the largest one.

14. A method for detecting the status of a telephone line using an interconnected telephone set having an ACTIVE state and an IDLE state, the ACTIVE state causing a first differential voltage to be present on the telephone line and the IDLE state causing a second differential voltage to be present on the telephone line, the method comprising the steps of:

measuring the first differential voltage when the state of the telephone set changes from the IDLE to the ACTIVE state;

measuring the second differential voltage when the state of the telephone set changes from the ACTIVE to the IDLE state;

selecting a reference voltage between the first and second differential voltages, said reference voltage being selected exclusively based on measurements of the first and second differential voltage magnitudes across the wire pair, but not upon any other stored parameter that relates to the impedance condition of the wire pair;

measuring a differential voltage, $V_{LINE}$, on the telephone line;

comparing $V_{LINE}$ with the magnitude of the reference voltage to determine which one is larger; and displaying the results of the comparison.

15. The method of claim 14 wherein the step of measuring the first differential voltage further includes the steps of:

measuring the first differential voltage each time the telephone set changes from the ACTIVE to the IDLE state;

storing a plurality of said first differential voltages; and selecting one of the first differential voltages to be averaged with the second differential voltage.

16. The method of claim 14 wherein the step of measuring the second differential voltage further includes the steps of:

measuring the second differential voltage each time the telephone set changes from the IDLE to the ACTIVE state;

storing a plurality of said second differential voltages; and selecting one of the second differential voltages to be averaged with the first differential voltage.

17. The method of claim 14 wherein the step of selecting the reference voltage comprises the steps of:

adding together the magnitudes of the first and second differential voltages; and dividing the result of the addition in half to form an arithmetically averaged voltage.

* * * * *